United States Patent [19]

Immonen et al.

[11] Patent Number: 5,227,058
[45] Date of Patent: Jul. 13, 1993

[54] APPARATUS FOR REMOVING LIQUID FROM THE THICKENERS, FILTERS, AND WASHERS

[75] Inventors: Pasi Immonen; Raimo Kohonen, both of Savonlinna, Finland

[73] Assignee: A. Ahlstrom Corporation, Noormarkku, Finland

[21] Appl. No.: 962,065

[22] Filed: Oct. 16, 1992

Related U.S. Application Data

[63] Continuation of Ser. No. 654,778, Feb. 13, 1991, abandoned.

[30] Foreign Application Priority Data

Feb. 13, 1990 [FI] Finland .................................. 900687

[51] Int. Cl.$^5$ ................... B01D 19/00; B01D 35/01
[52] U.S. Cl. ............................... 210/188; 210/258; 210/406; 210/416.1; 55/203
[58] Field of Search ............... 210/180, 188, 258, 348, 210/406, 416.1, 513; 55/20, 21, 36, 203, 208; 162/52, 60, 55, 335

[56] References Cited

U.S. PATENT DOCUMENTS

| | | | |
|---|---|---|---|
| 2,805,773 | 9/1957 | Mecklin | 210/188 |
| 3,102,491 | 9/1963 | Adams | 210/188 |
| 4,115,265 | 9/1978 | Otte | 210/180 |
| 4,172,791 | 10/1979 | Davister | 210/188 |
| 4,201,555 | 5/1980 | Tkach | 55/52 |
| 4,203,836 | 5/1980 | Hallack | 210/258 |
| 4,267,060 | 5/1981 | Miller | 210/406 |
| 4,435,193 | 3/1984 | Gullichsen | 55/203 |
| 4,952,314 | 8/1990 | Heinricson | 162/60 |
| 5,017,198 | 5/1991 | Schieg | 55/203 |
| 5,019,136 | 5/1991 | Elonen | 55/203 |

FOREIGN PATENT DOCUMENTS

801389 10/1980 Finland .
79248 3/1989 Finland .

OTHER PUBLICATIONS

J. Perry, ed., Chemical Engineers' Handbook, 3rd ed. (New York: McGraw-Hill Book Co., Inc., 1950), pp. 990–991.
V. Mueller, Grundoperationen Chemischer Verfahrenstechnik, 5th ed. (Leipzig, Germany: Veb Deutscher Verlag fuer Grundstoffindustrie, 1978), p. 180.

*Primary Examiner*—Ernest G. Therkorn
*Attorney, Agent, or Firm*—Cohen, Pontani, Lieberman, Pavane

[57] ABSTRACT

A method of removing liquid from a thickener, a filter, a washer or the like water-separating device obviates the need for the conventional use of a long drop leg and large filtrate tank. On an upstream face of a liquid-pervious member, a layer of liquid-containing substance is formed. At a downstream face of the liquid-pervious member, a negative pressure (e.g. partial vacuum) is generated to induce the flow of a liquid or a liquid-and-gas filtrate from the liquid-containing layer through the liquid-pervious member. The filtrate is conducted from the vicinity of the downstream face of the liquid-pervious to an inlet of a filtrate pump; such conducting of filtrate is carried out through an enclosed flow passage whereby the filtrate pump generates at least a portion of the negative pressure at the downstream face of the liquid-pervious member. An apparatus for likewise removing filtrate from a thickener, a filter, a washer or the like industrial filtering device is also disclosed.

17 Claims, 6 Drawing Sheets

APPARATUS FOR REMOVING LIQUID FROM THE THICKENERS, FILTERS, AND WASHERS

This is a continuation of U.S. application Ser. No. 07/654,778, filed Feb. 13, 1991, now abandoned.

BACKGROUND OF THE INVENTION

The present invention relates to a method and an apparatus for removal of filtrate from thickeners, filters, washers and the like devices. The method and the apparatus according to the invention are particularly suitable in dewatering devices of the wood processing industry i.e. in pulp and paper mills.

In pulp and paper manufacturing many devices of different types have been used for separating liquid (mainly water) from a fiber suspension. In washing or thickening processes, the fiber suspension is fed onto a wire or similar liquid-pervious, planar or curved members. A lower pressure (vacuum) prevails at the opposite, downstream surface of the member. The resulting pressure difference removes the liquid. The reason for separating liquid is mainly to increase the consistency of the suspension or to remove from the suspension liquid which contains chemicals or other liquids. The removal of liquid is always based on the difference of pressure prevailing on the opposite surfaces of the fiber layer due to which the liquid moves towards the lower pressure. One known method of creating a pressure difference is to pressurize the whole system. This is called pressurized thickening and the devices used are in principle pressure vessels. Another, more conventional, method is the so-called vacuum thickening in which a vacuum is generated on one side of the fiber layer which draws liquid from the fiber layer.

The vacuum is usually generated by a drop leg. The drop leg is typically about 10 meters long. This means that the thickening device or the washer in which the fiber layer to be drained must be located approx. ten meters higher than the filtrate tank which communicates with the filtrate space of the thickener or the washer via a pipe in such a way that air is prevented from flowing back to the thickener or the washer. The downwards flowing column of a liquid and gas mixture separated from the fiber layer causes suction at the fiber layer. The system is closed relative to the drop leg pipe and the liquid cannot flow from the pipe to the filtrate tank as the fiber layer in the thickener or the washer forms a "sealing" in the top end of the pipe. Only as much liquid can flow from the pipe to the filtrate tank as is separated from the fiber mat to the pipe. The level of the liquid in the pipe is determined so as to cause some volatilization of the liquid in the pipe by the vacuum created by the liquid column. The vacuum is determined by the length of the efficient suction leg (drop leg), i.e. the unbroken column of the liquid and gas mixture, and by the density of the mixture.

Despite the fact that modern mills use more and more pressurized thickening devices, they still employ a drop leg which in an apparently advantageous way increases the pressure difference over the fiber layer. However, either a ten meters deep space must be provided for the drop leg itself and the filtrate tank from which space the filtrate is pumped up for further treatment, or the thickener or the washer must be arranged in the mill at the level of ten meters above the point where the stock to be treated must be pumped. Thus, the employment of a drop leg involves extra investments already at the planning and construction stage of a mill. Further, either the filtrate or the fiber suspension to be treated must be pumped up for the said ten meters which of course means unnecessary energy consumption.

SUMMARY OF THE INVENTION

It is an object of the method and the apparatus of the invention to avoid or at least reduce the disadvantages discussed above by removing the filtrate from the suspension thickener/washer substantially at the level of the thickener/washer. Then the thickener/washer can be located in the ground floor of the pulp or paper mill and the filtrate can be pumped on at the same level. Furthermore, a typical feature of the apparatus according to the invention is that the use of a large filtrate tank is avoided.

In general terms, and considering one aspect thereof, the invention provides a method of removing liquid from a thickener, a filter, a washer or the like water separating devices, said method comprising the steps of:

a) forming a layer of a liquid-containing substance on an upstream face of a liquid-pervious member;

b) generating a negative pressure (e.g. a partial vacuum) at a downstream face of the liquid-pervious member to induce the flow of a liquid or liquid-and-gas filtrate from said layer through said member; and c) conducting the filtrate from the vicinity of the downstream face of said liquid pervious member to an inlet of a filtrate pump;

d) the step of conducting the filtrate to said inlet of the filtrate pump being carried out through an enclosed flow passage such that said pump generates at least a portion of the negative pressure at said downstream face of the liquid pervious member.

In another aspect, the invention provides an apparatus for removing filtrate from a thickener, a filter, a washer or the like industrial filtering device, which device is provided with filtrate removal means adapted to remove liquid or gas/liquid mixture from the respective filtering device, said filtrate removal means comprising a filtrate duct which forms an enclosed flow passage sealingly connected, at a discharge end to the suction side of a filtrate pump and, at an infeed end, to the respective filtering device.

BRIEF DESCRIPTION OF THE DRAWINGS

The apparatus and the method of the invention are described below in detail with reference to the accompanying simplified, diagrammatic drawings, wherein.

DETAILED DESCRIPTION OF PREFERRED EMBODIMENTS

Figure 1:
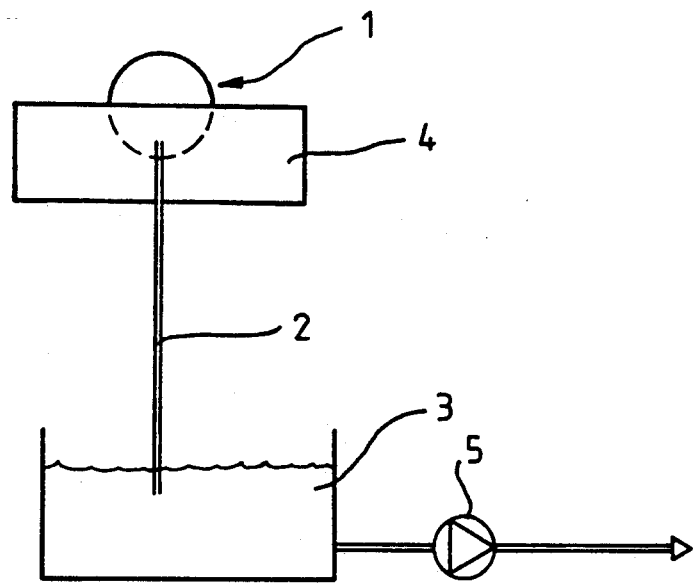
FIG. 1 illustrates a prior art thickening apparatus, i.e. a suction filter apparatus.

As illustrated in FIG. 1, a conventional suction filter unit comprises a filtering device 1 which may be a disc filter, a drum filter, a washer or the like; a drop leg 2; and a filtrate tank 3. Fiber suspension is introduced into a tank 4 of the filtering device the top of which tank is practically open to the surrounding space. While the filter discs or drums rotate at a relatively low speed around a horizontal axis in the tank 4, the vacuum prevailing at the other face of the wire surface of the filtering device causes a layer of stock to be picked up onto said wire surface. The drop leg 2 provides the suction required by the filtering process and causes the filtrate to flow via the leg 2 to a filtrate tank 3 from which it is pumped further by a pump 5. The filtrate includes large amount of air because of the intense vacuum values used for achieving as high consistencies as possible. Thus, a fairly large volume of air is drawn through the fiber layer to the drop leg 2 where it is mixed with the liquid. In the filtrate tank 3, the air separates from the liquid as the liquid stays freestanding in the tank for a while. Thus, air does not cause any noticeable problems in the discharge pump 5.

Figure 2:
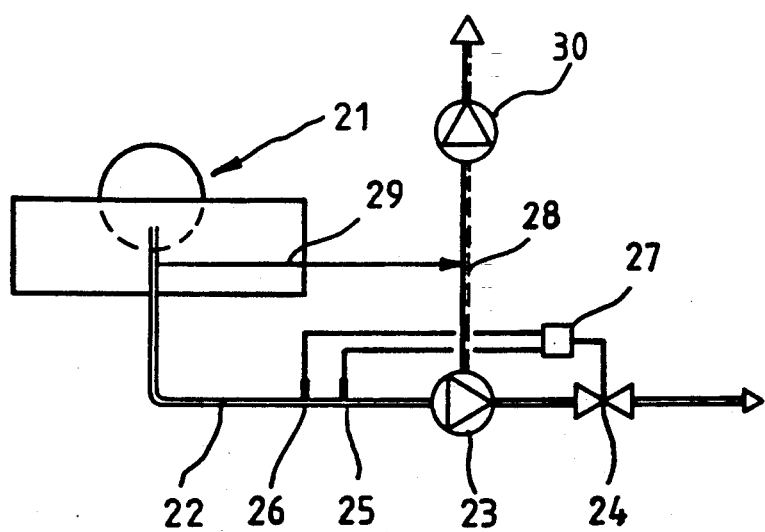
FIG. 2 illustrates a preferred embodiment of the invention replacing the high drop leg and the filtrate tank of FIG. 1.

In FIG. 2, a filtrate duct 22 of a drum filter or a disc filter 21, for drawing filtrate from behind a wire surface or surfaces of a filtering device, is directly connected to a pump 23 which is preferably a degassing centrifugal pump from which gas is discharged via a duct 28. The difference from conventional arrangements can be seen by comparing the present invention and the prior art arrangement illustrated in FIG. 1. The present invention dispenses with the drop leg and the filtrate tank of FIG. 1. In reality, the filtrate duct 22 leads to the pump 23 disposed substantially at the same level as the bottom of the tank of the filter. The term "substantially at the same level" in the context of this disclosure and claims means that the difference between the lowermost level of the tank or the like and the pump is not more than about 2 meters and this is substantially less than the 10 meter difference required for the known drop leg arrangement. Thus, in theory, an arrangement defined as being "substantially without an external drop leg" refers to a shorter-than-normal drop leg which could be about 2 meters or less high. The latter embodiment is considered to have the two ends "generally at the same level". This kind of arrangement substantially simplifies the plant layout and facilitates locating the filter 21 as there is no need to reserve space for a suction leg and a large filtrate tank. As already mentioned, it is advantageous to use a centrifugal pump which is capable of removing air or gas from the pumped liquid as the filtrate may contain large amounts of gas which could block the operation of a conventional centrifugal pump or at least may disturb it severely. FIG. 2 also illustrates the arrangement principle of a regulating and controlling unit used in connection with the centrifugal pump. The pressure side of the pump 23 is provided with a valve 24 which is preferably controlled by information received from a pressure sensor 25 on the suction side of the pump 23. In some cases, it is preferred to use information from a temperature sensor 26 on the suction side of the pump. Both information data are supplied to a control unit 27 or a corresponding device which regulates the throttle of the valve 24. The rotation speed of the pump can be controlled using the obtained parameters, whereby the capacity of the pump and at the same time the vacuum of the suction side is changed to a desired value. FIG. 2 also illustrates a feasible model in which gas is separated near the inlet end, i.e. at the beginning of the filtrate duct 22 via a connection 29. The arrangement could be generally referred to as an embodiment, wherein gas (air) is separated from the filtrate prior to the step of pumping which pumping, of course can only take place at the pump 23. In such arrangement, it is advantageous to use a gas-separating centrifugal pump. The vacuum pump, usually a so-called liquid ring pump 30, providing the suction for separation of the gas, has been placed outside the filtrate pump 23. In accordance with the embodiment of FIG. 2, both the connection 29 originating from the upflow end of the filtrate duct and the duct 28 discharging gas from the pump 23 have been arranged to be connected to the same vacuum pump 30, whereby an optimal structural solution is achieved.

Additionally, it is, of course, possible to arrange, if desired, a valve both in the connection 29 and in duct 28 for controlling the vacuum level in the conduits 28, 29. The vacuum pump for separating gas can also be incorporated within the centrifugal pump. One embodiment of such pump is disclosed in U.S. Pat. No. 4,776,758 issued Oct. 11, 1988 (Gullichsen), which is incorporated herein by reference. The arrangement with such a pump is not shown in the drawings. With this type of pump, gas would be drawn by the same vacuum pump (forming an integral part of pump 23) both from the filtrate duct 22 upstream of the pump, and from the gas discharge system of a filtering or the like apparatus. The vacuum pump section of the centrifugal pump would be provided with at least two suction connections, one for the internal suction and the other, being probably most often entirely closed, for external suction such as via a duct similar to 29 but now connected with the vacuum pump section part of the pump housing of the filtrate pump 23. The last mentioned embodiment therefore presents an operation wherein the step of separating the liquid (water) and the gas (air) takes place at the filtrate pump.

The last mentioned embodiment provides an additional advantage. Now that there is no need to minimize the amount of air in the filtrate discharged from a washer or a thickener, it is possible to increase the duration of the time period for which the processed material is subjected to dewatering suction. Thus, the suction stage can be started earlier, i.e. the suction source can be connected, to a washer/thickener at a point at which only a very small volume of liquid filtrate liquid has passed through the thickener wire, while the volume of air in the filtrate is relatively high. At such location, air is almost unavoidably drawn to the filtrate compartments, but, since the filtrate pumping system is less sensitive to air, the air does not cause any disruptions in pumping.

Figure 3:
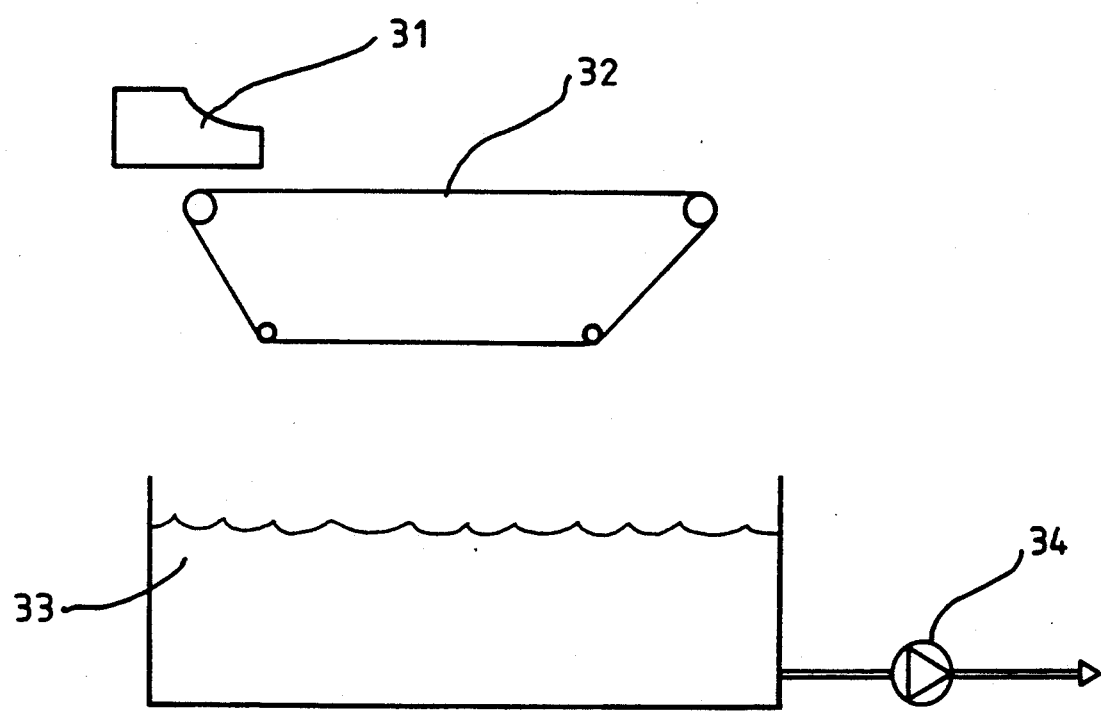
FIG. 3 illustrates a prior art wire thickener, which term can be applied also to a conventional paper making machine.

FIG. 3 illustrates another prior art device for separating water, comprising a head box 31 and a wire 32 onto which the suspension is distributed and through which the liquid is filtrated into a wire pit, i.e. a tank 33 in which air separates from the liquid before the liquid is pumped further by a pump 34.

Figure 4:
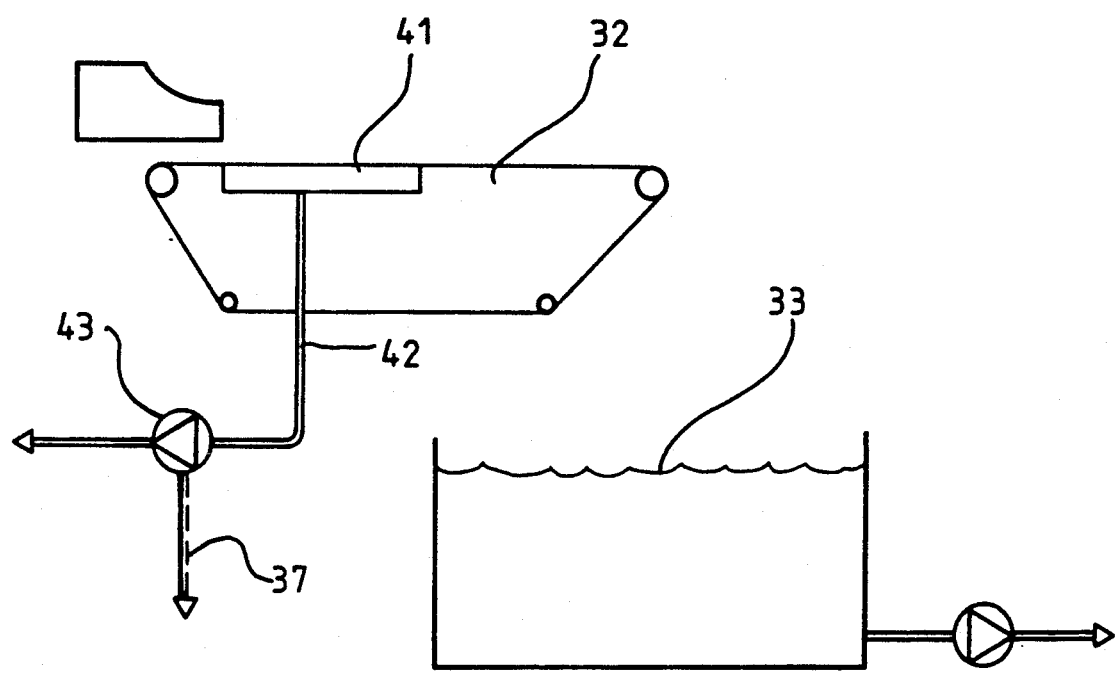
FIG. 4 illustrates another preferred embodiment of the invention replacing the drop leg and the filtrate tank of FIG. 3.

FIG. 4 illustrates the method and the apparatus of the invention applied to the arrangement of FIG. 3. A suction box 41, in practice a number of suction boxes, of a Fourdrinier thickener or a paper making machine is connected via a duct 42 to a pump 43 which is a degassing centrifugal pump from which the gas is taken further via a conduit 37. In this case the filtrate tank can be much smaller and the dewatering from the wire much more efficient.

Figure 5:
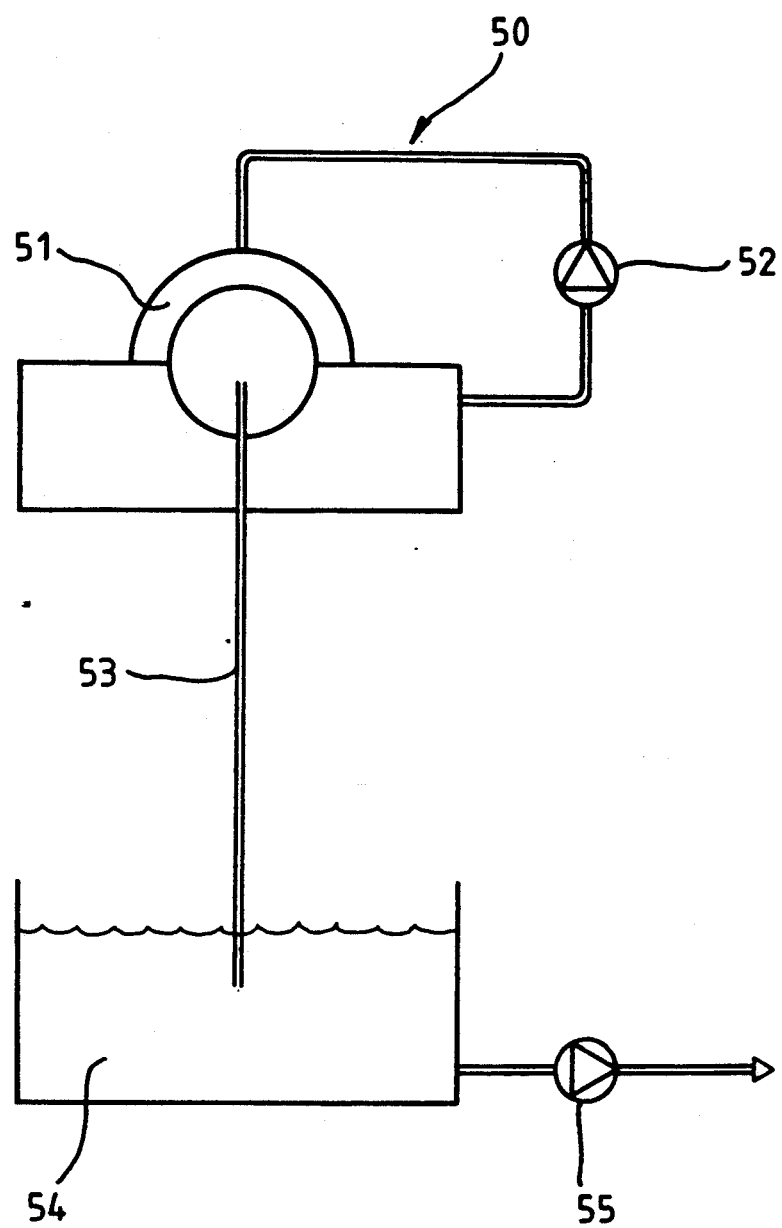
FIG. 5 illustrates a prior art pressurized thickener/washer.

Degassing pumps are commercially available. For instance, reference may be had to a brochure entitle AHLSTROM AHLSTAR PROCESS PUMPS published by A. Ahlstrom Corporation, Pump Industry, SF 4860 Karhula, Finland and distributed by its subsidiaries throughout the world. FIG. 5 illustrates yet another conventional water separating device 50, in which a rotating cylinder or, in case of a disc filter, a series of discs, is surrounded by a pressure proof hood 51. The pressure difference over the screen surface is created by a fan 52 which extracts air from the cylinder and forces the air in a pressurized state into the hood 51. A drop leg 53 is included also in this kind of a water separating device, and an air separation tank 54 from which filtrate which does not contain gas is discharged by a pump 55.

Figure 6:
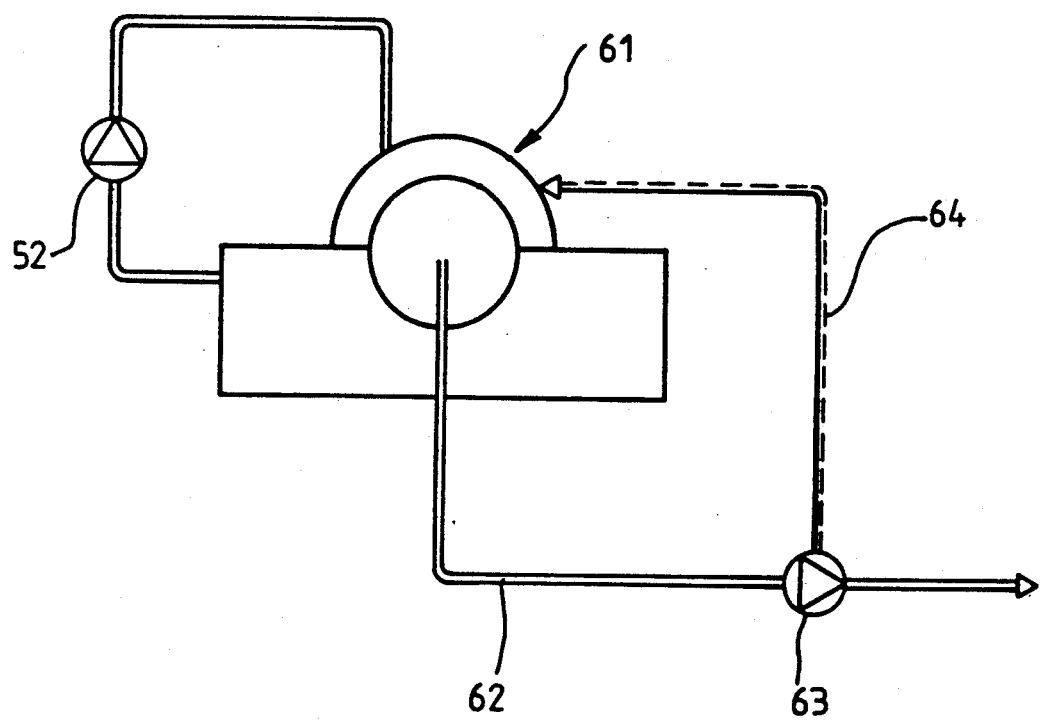
FIG. 6 illustrates a third preferred embodiment of the invention replacing the high drop leg and the filtrate tank of FIG. 5.

FIG. 6 illustrates yet another example of a method and an apparatus according to the invention. Filtrate from a pressure filter 61 is transported via a filtrate duct 62 to a pump 63 which is a degassing centrifugal pump. Conventional pressurizing means, i.e. a fan 52, can be as used in the embodiment of the FIG. 5. Further, the gas, which contains liquid and/or liquid and vapour, which had been separated by the pump 63, can also be introduced into the hood via a conduit 64 whereby a separate liquid separator for the gas mixture separated at 63 is not needed. FIG. 6 does not illustrate a separate fan in connection with the conduit 64 but it obvious to a person skilled in the art that a fan could be included in the conduit 64 if the degassing system of the pump 63 is not strong enough to blow the gas into the hood. The advantage of this application compared to that of FIG. 5 is in that no filtrate tank is needed, which facilitates the placement of the filter 61 at a desired location of a mill.

Thus, all the present embodiments dispense with the necessity to place the washer/thickener at a certain height above other apparatus and tanks.

Figure 7:
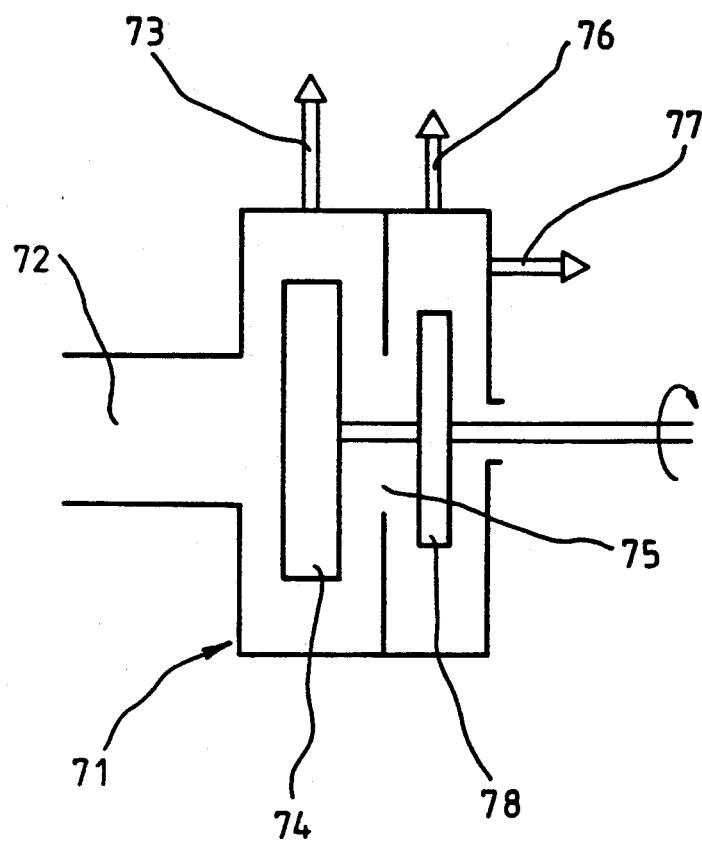
FIG. 7 illustrates schematically a side view of a preferred embodiment of a pump carrying out the method of the invention.

FIG. 7 illustrates, in a diagrammatic way, an alternative pump which can be used with many washers/thickeners since the degassing capacity of the pump is adequate in all predictable situations. This diagrammatic representation relates to pumps such as the pump disclosed in U.S. Pat. No. 4,201,555 issued May 6, 1980 (Tkach), which is incorporated herein by reference. The air-containing liquid flows into a pump 71 via an inlet 72 and pressurized, practically gas-free liquid is discharged via an outlet 73. The gas (air) is separated by an impeller 74 wherefrom it passes via an opening 75 to the back of the impeller 74 where the liquid blown in with the air is separated via a passage 76 and the air via an opening 77. If necessary, a separate vaned wheel 78 can be disposed at the back of the pump to pump the liquid and thus to assist in the separation of the liquid and the gas in the space behind the impeller. If necessary, the degassing capacity of the pump can be enhanced by connecting the air discharge opening 77 to a vacuum system, e.g. to a vacuum pump. In the way described above the pump can accept gaseous liquid and pump degassified liquid to the desired location. If necessary, the air discharged via passage 77 can be taken to a water separator, in which the liquid carried by the air is separated from the air and discharged to the filtrate. In the embodiments illustrated in FIGS. 2 and 4,
the gas discharged via conduits 28 and 37 can, because of its possible liquid content, be guided in the corresponding way to a liquid separator.

Of course the gas/air removal can be arranged in other ways, too. An apparatus can be provided between the pump and the stock treating device in which apparatus the air is partly or entirely removed from the stock. In the latter case a centrifugal pump of special construction is not needed, as the air content of the stock can be so small that a centrifugal pump can pump the stock without a substantial reduction of capacity. However, if the air content of the stock after air separator is still so high that an ordinary centrifugal pump cannot pump the stock, or if the gas would cause problems in the following process steps, a degassing centrifugal pump can be used; thus gas is removed both in a separate gas separator and in the pump. Also, the suction end of the filtrate removal conduit at the stock treating device itself can be equipped to separate gas. In such case, the suction end is designed to promote the separation of gas from the filtrate and the separated gas can be removed from the suction end e.g. by a vacuum pump (illustrated in FIG. 2, reference numeral 29).

Apart from the pumping of the liquid/air mixture, the pump also generates a certain vacuum level, in other words a certain vacuum on the suction side which is utilized to replace the suction leg of a filter/washer. The vacuum can be adjusted so as to avoid boiling liquid in the suction opening of the pump, for example by providing a valve on the pressure side of the pump which valve is regulated as a function of the instant vacuum valve at the suction side and possibly also of the temperature of the liquid, as shown at 26 and 25, FIG. 2. One possibility of regulating the underpressure is also changing the rotation speed of the pump which in practice gives the same result as the throttling of the pressure side.

Despite the fact that both pumps intended for separation of gas and also pumps separating gas and using cavitation for this purpose are known from the state of the art, it has never been suggested that the suction of such centrifugal pump be utilized as a whole for supporting the operation of another apparatus preceding the centrifugal pump in the process, for example, for generating a vacuum by means of which liquid is removed from the fiber layer in a washer/thickener.

As described above, a totally new apparatus and a method differing from the state of the art has been developed for removing filtrate from the washers and filters of both the wood processing industry and other branches of industry. According to a preferred embodiment of the new apparatus, the large filtrate tanks and high drop legs used conventionally are replaced by a fairly simple centrifugal pump which may be provided with an efficient degassing device. Thus new mill installations can be carried out remarkably more freely and with smaller space reservations, resulting in extensive investment savings.

Those skilled in the art will recognize that many modifications can be provided of the described invention without departing from the scope of the present invention. Accordingly, we wish to protect by letters patent issued on the present application all such embodiments as properly fall within the scope of our contribution to the art.

What is claimed is:

1. Apparatus for removing filtrate from a thickener, a filter or a washer without use of a large filtrate tank by means of negative pressure, the thickener, filters or washer having a bottom located on a level, the apparatus comprising:
- a filtrate removal means for removing one of a liquid and gas/liquid mixture;
- a filtrate duct having an infeed end and a discharge end, said filtrate duct being sealingly connected at said infeed end to said filtrate removal means to remove one of said liquid and gas/liquid mixture from said filtrate removal means; and
- a filtrate pump located on the same level for providing negative pressure for removing the filtrate having a housing, a suction side being upstream of said pump and a pressure side being downstream of said pump, said filtrate pump being sealingly connected at said suction side to said discharge end of said filtrate duct to form an enclosed passage, wherein said filtrate pump is a centrifugal pump, and wherein said filtrate pump is provided with a gas separating means located within said housing of said filtrate pump or downstream thereof for separating gas from the filtrate.

2. Apparatus as claimed in claim 1, wherein said pressure side of said filtrate pump is provided with a throttle valve.

3. Apparatus for removing filtrate from a thickener, a filter or a washer without use of a large filtrate tank by means of negative pressure, the thickener, filters or washer having a bottom located on a level, the apparatus comprising:
- a filtrate removal means for removing one of a liquid and gas/liquid mixture;
- a filtrate duct having an infeed end and a discharge end, said filtrate duct being sealingly connected at said infeed end to said filtrate removal means to remove one of said liquid and gas/liquid mixture from said filtrate removal means;
- a filtrate pump located on the same level for providing negative pressure for removing the filtrate having a housing and gas separating means a suction side being upstream of said pump and a pressure side being downstream of said pump, said filtrate pump being sealingly connected at said suction side to said discharge end of said filtrate duct to form an enclosed passage, wherein said pressure side of said filtrate pump is provided with a throttle valve; and
- a regulating circuit that controls said throttle valve in response to the pressure and temperature on said suction side of said filtrate pump.

4. Apparatus as claimed in claim 3, wherein said filtrate pump is a centrifugal pump.

5. Apparatus as claimed in claim 3, wherein said filtrate pump is provided with gas separating means located within said housing of said filtrate pump or downstream thereof for separating gas from the filtrate.

6. Apparatus as claimed in claim 5, wherein said filtrate pump is a centrifugal pump.

7. Apparatus for removing filtrate from a thickener, a filter or a washer without use of a large filtrate tank by means of negative pressure, the thickener, filters or washer having a bottom located on a level, the apparatus comprising:
- a filtrate removal means for removing one of a liquid and gas/liquid mixture;
- a filtrate duct having an infeed end and a discharge end, said filtrate duct being sealingly connected at said infeed end to said filtrate removal means to remove one of said liquid and gas/liquid mixture from said filtrate removal means;
- a filtrate pump located on the same level for providing negative pressure for removing the filtrate having a housing, a suction side being upstream of said pump and a pressure side being downstream of said pump, said filtrate pump being sealingly connected at said suction side to said discharge end of said filtrate duct to form an enclosed passage;
- a vacuum pump having a suction side; and
- a gas removal conduit having an upstream end and a downstream end, said upstream end of said gas removal conduit being connected to said filtrate duct at a point upstream of said filtrate pump, said downstream end of said gas removal conduit being connected to said suction side of said vacuum pump.

8. Apparatus as claimed in claim 7, wherein said filtrate pump is a centrifugal pump provided with gas separating means located within a housing of the filtrate pump or downstream thereof for separating gas from the filtrate.

9. Apparatus for removing filtrate from a thickener, a filter or a washer without use of a large filtrate tank by means of negative pressure, the thickener, filters or washer having a bottom located on a level, the apparatus comprising:
- a filtrate removal means for removing one of a liquid and gas/liquid mixture;
- a filtrate duct having an infeed end and a discharge end, said filtrate duct being sealingly connected at said infeed end to said filtrate removal means to remove one of said liquid and gas/liquid mixture from said filtrate removal means;
- a filtrate pump located on the same level for providing negative pressure for removing the filtrate having a housing, a suction side being upstream of said pump and a pressure side being downstream of said pump, said filtrate pump being sealingly connected at said suction side to said discharge end of said filtrate duct to form an enclosed passage wherein said filtrate pump is provided with a gas separating means located within a housing of the filtrate pump or downstream thereof for separating gas from the filtrate;
- a vacuum pump having a suction side; and
- a gas removal conduit having an upstream end and a downstream end, said upstream end of said gas removal conduit being connected to said filtrate duct at a point upstream of said filtrate pump, said downstream end of said gas removal conduit being connected to said suction side of said vacuum pump.

10. Apparatus for removing filtrate from a thickener, a filter or a washer without use of a large filtrate tank by means of negative pressure, the thickener, filters or washer having a bottom located on a level, the apparatus comprising:
- a filtrate removal means for removing one of a liquid and gas/liquid mixture;
- a filtrate duct having an infeed end and a discharge end, said filtrate duct being sealingly connected at said infeed end to said filtrate removal means to remove one of said liquid and gas/liquid mixture from said filtrate removal means;
- a filtrate pump located on the same level for providing negative pressure for removing the filtrate having a housing, a suction side being upstream of said pump and a pressure side being downstream of said pump, said filtrate pump being sealingly connected at said suction side to said discharge end of said filtrate duct to form an enclosed passage, wherein said filtrate pump is a centrifugal pump, a vacuum pump having a suction side; and a gas removal conduit having an upstream end and a downstream end, said upstream end of said gas removal conduit being connected to said filtrate duct at a point upstream of said filtrate pump, said downstream end of said gas removal conduit being connected to said suction side of said vacuum pump.

11. Apparatus for removing filtrate from a thickener, a filter or a washer without use of a large filtrate tank by means of negative pressure, the thickener, filters or washer having a bottom located on a level, the apparatus comprising:

a filtrate removal means for removing one of a liquid and gas/liquid mixture;

a filtrate duct having an infeed end and a discharge end, said filtrate duct being sealingly connected at said infeed end to said filtrate removal means to remove one of said liquid and gas/liquid mixture from said filtrate removal means; and a filtrate pump located on the same level for providing negative pressure for removing the filtrate having a housing, a suction side being upstream of said pump and a pressure side being downstream of said pump, said filtrate pump being sealingly connected at said suction side to said discharge end of said filtrate duct to form an enclosed passage;

a vacuum pump having a suction side, wherein said suction side of said vacuum pump is connected to said housing of said filtrate pump to draw gas from said filtrate pump; and a gas removal conduit having an upstream end and a downstream end, said upstream end of said gas removal conduit being connected to said filtrate duct at a point upstream of said filtrate pump, said downstream end of said gas removal conduit being connected to said suction side of said vacuum pump.

12. Apparatus as claimed in claim 11, wherein said filtrate pump is a centrifugal pump.

13. Apparatus as claimed in claim 11, wherein said filtrate pump is provided with gas separating means located within a housing of the filtrate pump or downstream thereof for separating gas from the filtrate.

14. Apparatus as claimed in claim 13, wherein said filtrate pump is a centrifugal pump.

15. Apparatus for removing filtrate from a thickener, a filter or a washer without use of a large filtrate tank by means of negative pressure, the thickener, filters or washer having a bottom located on a level, the apparatus comprising:

a filtrate removal means for removing one of a liquid and gas/liquid mixture;

a filtrate duct having an infeed end and a discharge end, said filtrate duct being sealingly connected at said infeed end to said filtrate removal means to remove one of said liquid and gas/liquid mixture from said filtrate removal means; and a filtrate pump located on the same level for providing negative pressure for removing the filtrate having a housing, a suction side being upstream of said pump and a pressure side being downstream of said pump, said filtrate pump being sealingly connected at said suction side to said discharge end of said filtrate duct to form an enclosed passage, wherein said filtrate pump is provided with a gas separating means located within said housing of said filtrate pump or downstream thereof for separating gas from the filtrate; and a vacuum pump having a suction side, wherein said suction side of said vacuum pump is connected to said housing of said filtrate pump to draw gas from said filtrate pump.

16. Apparatus for removing filtrate from a thickener, a filter or a washer without use of a large filtrate tank by means of negative pressure, the thickener, filters or washer having a bottom located on a level, the apparatus comprising:

a filtrate removal means for removing one of a liquid and gas/liquid mixture;

a filtrate duct having an infeed end and a discharge end, said filtrate duct being sealingly connected at said infeed end to said filtrate removal means to remove one of said liquid and gas/liquid mixture from said filtrate removal means;

a filtrate pump located on the same level for providing negative pressure for removing the filtrate having a housing, a suction side being upstream of said pump and a pressure side being downstream of said pump, said filtrate pump being sealingly connected at said suction side to said discharge end of said filtrate duct to form an enclosed passage, wherein said filtrate pump is a centrifugal pump; and a vacuum pump having a suction side, wherein said suction side of said vacuum pump is connected to said housing of said filtrate pump to draw gas from said filtrate pump.

17. Apparatus as claimed in claim 16, wherein said filtrate pump is provided with gas separating means located within a housing of the filtrate pump or downstream thereof for separating gas from the filtrate.

* * * * *